US012332490B2

(12) United States Patent
Kim et al.

(10) Patent No.: US 12,332,490 B2
(45) Date of Patent: Jun. 17, 2025

(54) MEDIA ADAPTOR FOR MULTIMODE WAVEGUIDE INTERCONNECTS

(71) Applicant: Hirose Electric Co. Ltd., Kanagawa (JP)

(72) Inventors: Kihong Kim, San Jose, CA (US); Jeremy Buan, San Jose, CA (US); Yutaka Iwasaki, San Jose, CA (US)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 249 days.

(21) Appl. No.: 17/943,219

(22) Filed: Sep. 13, 2022

(65) Prior Publication Data

US 2023/0094831 A1 Mar. 30, 2023

Related U.S. Application Data

(60) Provisional application No. 63/248,241, filed on Sep. 24, 2021.

(51) Int. Cl.
| | |
|---|---|
| *G02B 6/125* | (2006.01) |
| *G02B 6/42* | (2006.01) |
| *G02B 6/43* | (2006.01) |
| *G02B 6/38* | (2006.01) |

(52) U.S. Cl.
CPC ............. *G02B 6/43* (2013.01); *G02B 6/125* (2013.01); *G02B 6/4202* (2013.01); *G02B 6/4238* (2013.01); *G02B 6/4249* (2013.01); *G02B 6/3897* (2013.01)

(58) Field of Classification Search
CPC .... G02B 6/125; G02B 6/3897; G02B 6/4202; G02B 6/4238; G02B 6/4249; G02B 6/43
See application file for complete search history.

(56) References Cited

U.S. PATENT DOCUMENTS

| | | | | |
|---|---|---|---|---|
| 6,229,712 | B1 * | 5/2001 | Munoz-Bustamante | .................... G02B 6/43 361/783 |
| 6,907,173 | B2 * | 6/2005 | Hiramatsu | ........... G02B 6/1221 385/39 |
| 6,955,481 | B2 * | 10/2005 | Colgan | ................ G02B 6/4214 385/88 |
| 7,062,132 | B2 * | 6/2006 | Basavanhally | ...... G02B 6/3897 385/24 |
| 7,062,144 | B2 * | 6/2006 | Hwang | .................. G02B 6/423 385/139 |
| 7,136,551 | B2 * | 11/2006 | Cho | ......................... G02B 6/06 385/115 |

(Continued)

FOREIGN PATENT DOCUMENTS

| | | |
|---|---|---|
| JP | H1114856 A | 1/1999 |
| JP | 2005062377 A | 3/2005 |

(Continued)

*Primary Examiner* — Ryan A Lepisto
(74) *Attorney, Agent, or Firm* — Procopio, Cory, Hargreaves & Savitch LLP

(57) ABSTRACT

Example implementations described herein involve a media adaptor configured to provide electrical/optical and optical/electrical conversion for a multi-mode waveguide (MMWG) interconnect, the media adaptor involving one or more ball grid arrays; and a tail-cut fiber array block (tcFAB) connected to a first array of photodiodes and a second array of laser diodes from direct optical wire (DOW) bonding.

6 Claims, 14 Drawing Sheets

(56) References Cited

U.S. PATENT DOCUMENTS

| | | | |
|---|---|---|---|
| 7,200,295 B2 | 4/2007 | Rolston et al. | |
| 7,263,256 B2* | 8/2007 | Kim | G02B 6/43 385/32 |
| 7,359,594 B2* | 4/2008 | Nishizawa | G02B 6/4214 385/32 |
| 7,486,847 B1* | 2/2009 | Dellmann | G02B 6/421 385/88 |
| 7,931,411 B2* | 4/2011 | Kurita | G02B 6/4201 385/88 |
| 8,285,087 B2* | 10/2012 | Kim | G02B 6/43 385/129 |
| 8,705,916 B2* | 4/2014 | Okuyama | G02B 6/4246 385/32 |
| 8,977,078 B2* | 3/2015 | Lee | G02B 6/43 385/32 |
| 9,034,222 B2* | 5/2015 | Koos | G02B 6/138 264/1.24 |
| 9,319,148 B2* | 4/2016 | Kerrigan | H04B 10/801 |
| 9,323,017 B2* | 4/2016 | Choi | G02B 6/43 |
| 9,651,751 B1* | 5/2017 | Ding | G02B 6/4232 |
| 9,766,411 B2* | 9/2017 | Butler | G02B 6/4202 |
| 9,933,574 B1* | 4/2018 | Zhang | G02B 6/4239 |
| 10,001,611 B2* | 6/2018 | Ding | H01L 23/48 |
| 10,025,047 B1* | 7/2018 | Liu | H05K 1/11 |
| 10,162,112 B2* | 12/2018 | Sutherland | G02B 6/3608 |
| 10,234,644 B1* | 3/2019 | Butler | G02B 6/02395 |
| 10,393,959 B1* | 8/2019 | Razdan | H01L 23/5384 |
| 10,564,354 B2* | 2/2020 | Fortusini | G02B 6/125 |
| 10,598,860 B2* | 3/2020 | Ramachandran | G02B 6/4471 |
| 10,627,588 B2* | 4/2020 | Florian Lohse | G02B 6/43 |
| 10,716,213 B2* | 7/2020 | Kim | H05K 1/117 |
| 10,866,376 B1* | 12/2020 | Ghiasi | G02B 6/4292 |
| 10,921,534 B2* | 2/2021 | Dong | G02B 6/4245 |
| 10,924,269 B1* | 2/2021 | Ding | H05K 1/0274 |
| 10,948,658 B2* | 3/2021 | Florian Lohse | G02B 6/4227 |
| 10,996,412 B2* | 5/2021 | Perminjat | G02B 6/43 |
| 11,204,466 B2* | 12/2021 | Butler | G02B 6/3652 |
| 11,353,668 B2* | 6/2022 | Erickson | G02B 6/4269 |
| 11,500,165 B2* | 11/2022 | Ueda | G02B 6/12004 |
| 11,764,878 B2* | 9/2023 | Pezeshki | G02B 6/43 398/164 |
| 11,895,798 B2* | 2/2024 | Winzer | H05K 1/141 |
| 11,988,867 B2* | 5/2024 | Peng | G02B 6/12004 |
| 2007/0292081 A1* | 12/2007 | Hashimoto | G02B 6/4277 385/52 |
| 2009/0214158 A1* | 8/2009 | Lee | G02B 6/43 385/14 |
| 2010/0171023 A1* | 7/2010 | Asahi | G02B 6/4214 250/227.11 |
| 2011/0206379 A1* | 8/2011 | Budd | H05K 1/141 250/208.2 |
| 2012/0207426 A1* | 8/2012 | Doany | G02B 6/426 257/E33.056 |
| 2018/0017748 A1* | 1/2018 | Mir Shafiei | G02B 6/43 |
| 2020/0241220 A1* | 7/2020 | Evans | G02B 6/13 |

FOREIGN PATENT DOCUMENTS

| | | |
|---|---|---|
| JP | 2008523581 A | 7/2008 |
| JP | 2009003272 A | 1/2009 |
| JP | 2009198922 A | 9/2009 |
| JP | 2014167982 A | 9/2014 |
| JP | 2017032695 A | 2/2017 |
| JP | 2019100990 A | 6/2019 |

* cited by examiner

MEDIA ADAPTOR FOR MULTIMODE
WAVEGUIDE INTERCONNECTS

CROSS REFERENCE TO RELATED
APPLICATIONS

This patent application is based on and claims the benefit of priority from provisional U.S. patent application No. 63/248,241, filed on Sep. 24, 2021, the disclosure of which is hereby incorporated by reference herein in its entirety for all purposes.

BACKGROUND

Field

The present disclosure is generally directed to electronic systems having photonic integrated circuits (PIC), and more specifically, to media adaptors for multimode waveguide interconnects.

Related Art

There have been recent developments in electrical printed circuit boards having embedded optical waveguides to provide light to be converted into electrical signals and vice versa. Such systems are known as printed optical circuit boards, and are referred to herein referred to as printed optical boards (POBs).

In a system that has PIC on a POB which is referred to as 'PIC system' hereafter, as the copper traces of the PIC systems collapse towards zero, the optical connectors become crowded in the immediate vicinity of the System on Chip (SoC). Unfortunately, there are no optical Input/Output (I/O) standards for this crowded-bus environment. The input and output of PIC (equivalent to the I/O buffer and the bonding pad of electrical systems), also known as off-chip optical bus, do not have any candidate solutions, industry consensus, or standard activities. The lack of such solutions is a near-term challenge facing connector makers that are involved with PIC components.

There have been recent developments in the design of a printed optical board (POB) to involve embedded waveguides within the circuit board. FIG. 1 illustrates an example POB system. Specifically, FIG. 1 illustrates an optical waveguide core layer which is embedded in a printed circuit board (PCB) material and process. The arrows indicate directions of light paths from the optical modules to the SoC. Since the optical layer and the electrical layer are aligned in manufacturing, assembly houses do not need to provide extra alignment. However, the material system requires a new lamination process, which increases the cost and yields unknown field product reliability.

FIG. 2 illustrates a multi-mode waveguide (MMW) system. In the example illustrated in FIG. 2, there are one or more multi-mode waveguide (MMW) PICs 206 that are connected to a POB 210 to interface with a chiplet 208 connected to an ultra-optical fiber cable 203 through a waveguide to fiber cable connector 202. Each of the one or more MMW PICs 206 include an MMW 205 configured to facilitate optical signal from the MMW PIC to the POB, and are connected, via a bidirectional channel, to an embedded digital equalizer 201 configured to conduct electrical signal/optical signal conversion. In the system as described herein, MMW PICs 206 and PIC 208 can be configured to conduct aggregation, optical switching (e.g., switching function) and electrical function depending on the desired implementation. Such implementations can avoid single mode approaches.

Embedded digital equalizer 201 is configured to conduct electrical signal to optical signal conversion for egress signals from the MMW PICs 206 through the MMW 205, or optical signal to electrical signal conversion for ingress signals from the MMW 205 to the MMW PICs 206. In an example, the embedded digital equalizer 201 can involve a Serializer/Deserializer (SERDES) linear or non-linear equalizer scheme to compensate the impairments that MMW 205 will generate. The impairment induced by the MMW 205 (either from the multi-mode waveguide or fiber) is in the form of modal dispersion. This is deterministic noise like reflection and insertion which can be compensated by an embedded digital equalizer 201, whether it be a linear equalizer or non-linear equalizer. Embedded digital equalizer 201 interfaces between the MMW PICs 206 and the MMW 205 through a chip to waveguide connector 211. As described herein, the embedded digital equalizer 201 is utilized for channel signal impairments over optical paths.

MMW Bus 204 involves waveguides embedded in the POB 210 that are connected to the PICs 206 via waveguide to waveguide connector 207 to aggregate the optical signals going through the POB 210. The waveguide to waveguide connector 207 is an optical signal to optical signal interface which directs the optical signal through MMW Bus 204 along the signal flow direction 200 for an egress signal, or from the MMW Bus 204 through MMW PICs 206 for an ingress signal.

PIC 208 can involve both an MMW PIC and a single mode waveguide (SMW) PIC and is configured to connect to ultra-optical fiber cable 203 through a waveguide to fiber cable connector 202. PIC 208 also connects to POB 210 with a chip to waveguide connector 211 to interface the PIC 208 with the MMW Bus 204. Similarly, PIC 208 can also involve an equalizer to facilitate optical signal to electrical signal for an egress signal 200 from the MMW PICs 206 to the PIC 208, or electrical signal to optical signal to the MMW Bus 204 for an ingress signal. PIC 208 is configured to convert the optical signals received from the MMW Bus 204 through the chip to waveguide connector 211 into an electrical signal, which can then be converted to an optical signal for output to an ultra-optical fiber cable 203, such as a single mode fiber (SMF) cable.

In the example of FIG. 2, the PICs 206 can be in the form of transport PICs (tPIC) and PIC 208 can be in the form of a Switch PIC (swPIC). In example implementations described herein, the tPICs are configured to have multimode wave guide interfaces facilitated by waveguide connector 211, whereas the Switch PIC has both the multi-mode wave guide interface as well as the SMF interface for the cable 203.

SUMMARY

Aspects of the present disclosure involve a media adaptor configured to provide electrical/optical and optical/electrical conversion for a multi-mode waveguide (MMWG) interconnect, the media adaptor involving one or more ball grid arrays; a tail-cut fiber array block (tcFAB) connected to a first array of photodiodes and a second array of laser diodes from direct optical wire (DOW) bonding.

Aspects of the present disclosure involve a multi-mode waveguide (MMWG) interconnect which can include a media adaptor configured to provide electrical/optical and optical/electrical conversion for a multi-mode waveguide (MMWG) interconnect, the media adaptor involving one or more ball grid arrays; a tail-cut fiber array block (tcFAB) connected to a first array of photodiodes and a second array of laser diodes from direct optical wire (DOW) bonding, and a printed circuit board involving MMWGs connected to the media adaptor by DOW bonding.

DETAILED DESCRIPTION

Figure 1:
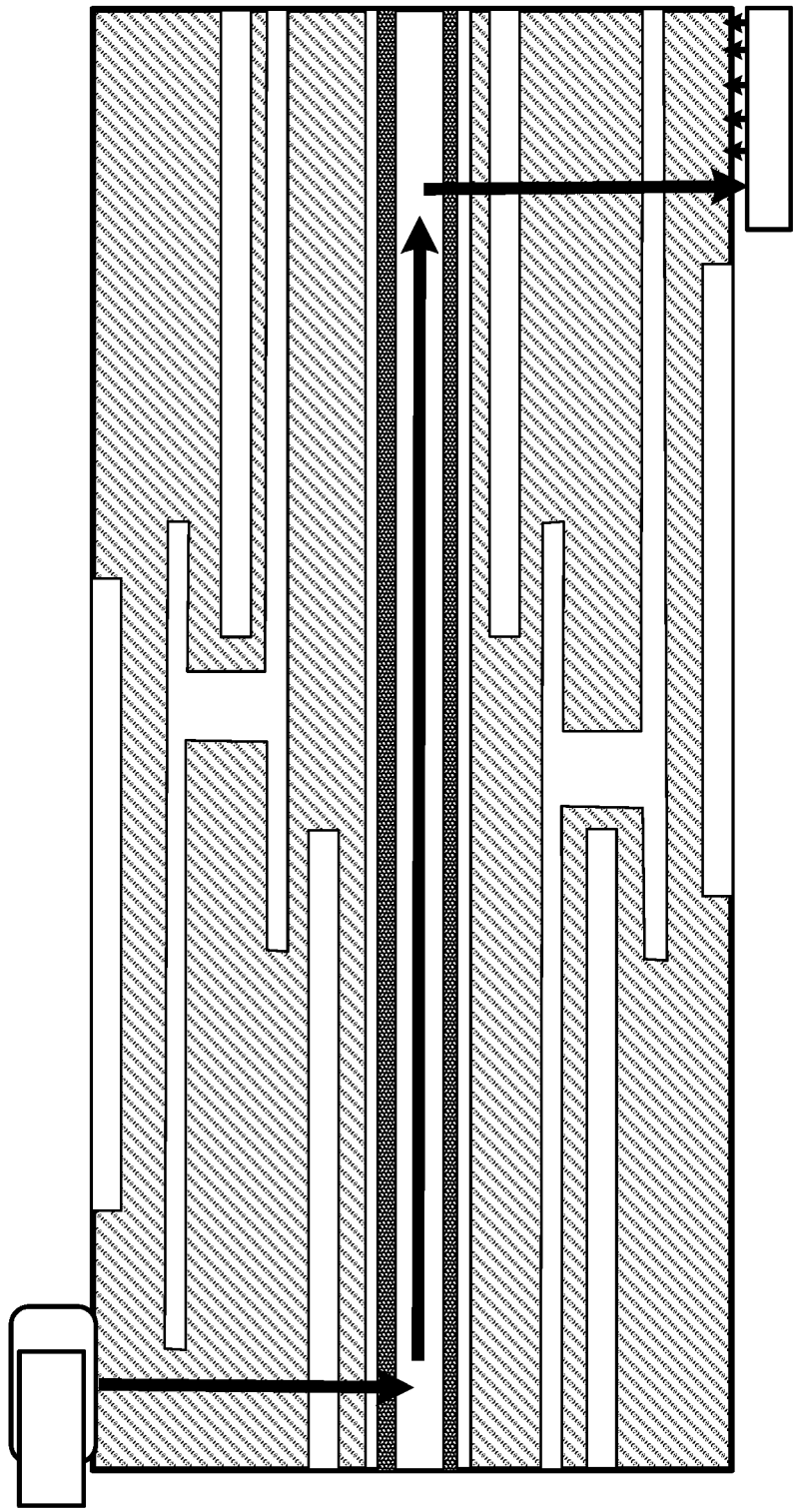
FIG. 1 illustrates an example Printed Optical Board (POB) system.
Figure 2:
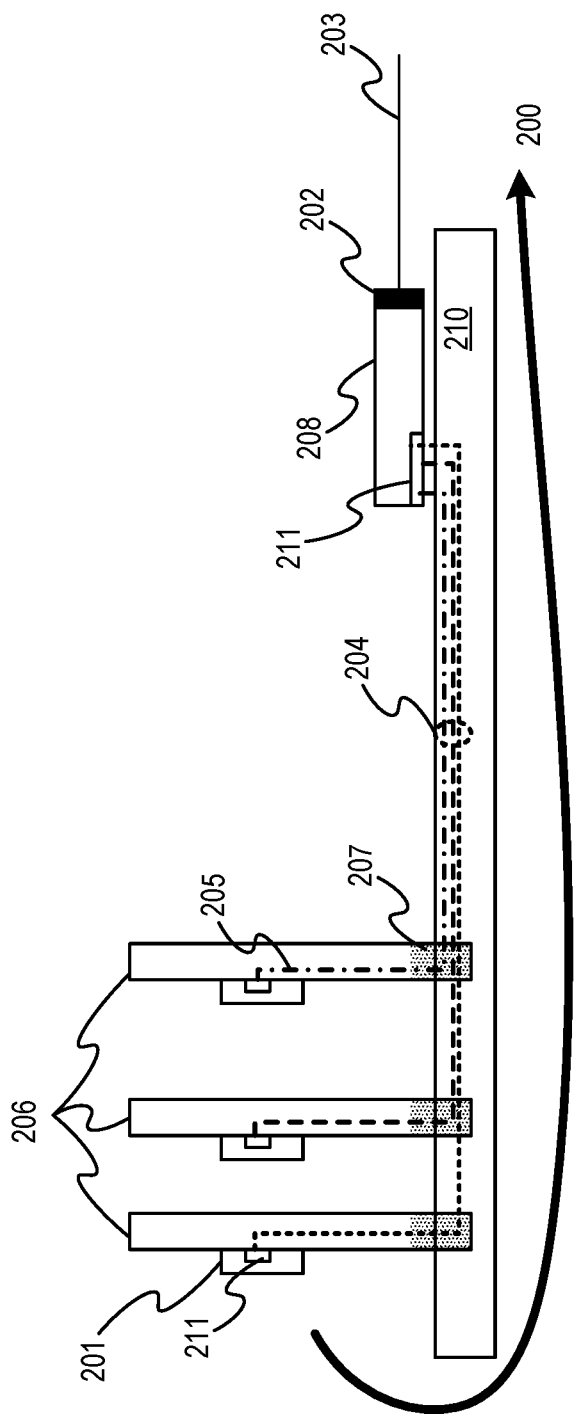
FIG. 2 illustrates an example multi-mode waveguide system.

The following detailed description provides further details of the figures and example implementations of the present application. Reference numerals and descriptions of redundant elements between figures are omitted for clarity. Terms used throughout the description are provided as examples and are not intended to be limiting. Example implementations described herein may be used singularly, or in combination other example implementations described herein, or with any other desired implementation.

Example implementations described herein involve a MMWG interconnect system which can reduce or replace copper traces with optical multimode waveguides. In example implementations described herein, the Media/MMWG Adaptor (MA), or Media Adaptor is a thin layer without a digital filter for an electrical/optical and optical/electrical conversion. The MAs described herein can be integrated vertically in a two-dimensional area in an interposer-like form. The term "Media Adaptor" and "MMWG Adaptor" may be used interchangably herein.

Figure 3:
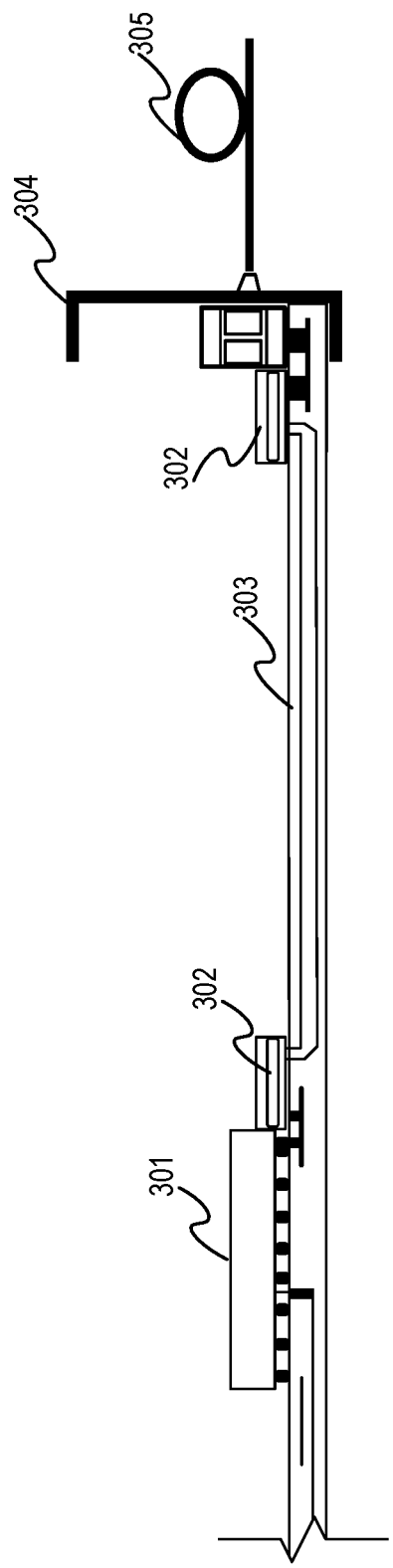
FIG. 3 illustrates an example proposed interconnection scheme for chip to module from using an optical multimode waveguide (MMWG) and Media/MMWG adaptors (MA), in accordance with an example implementation.

FIG. 3 illustrates an example proposed interconnection scheme for chip to module from using an optical multimode waveguide (MMWG) and Media/MMWG adaptors (MA), in accordance with an example implementation. Specifically, FIG. 3 illustrates the use of MMWGs 303 and MAs 302 to keep pluggable optics in the faceplate 304. In example implementations described herein, the MAs 302 are in the form of thin electrical interfaces as will be described herein. Example implementations utilize printed optical waveguides (specifically MMWGs) inside the PCB layer for an interconnection path between the system on chip (SoC)/switch chip 301 and optical module such as fiber 305, or another chip depending on the desired implementation. This system increases the interconnection bandwidth and power efficiency (bit/pJ) and removes human error during the assembly process.

Figure 4:
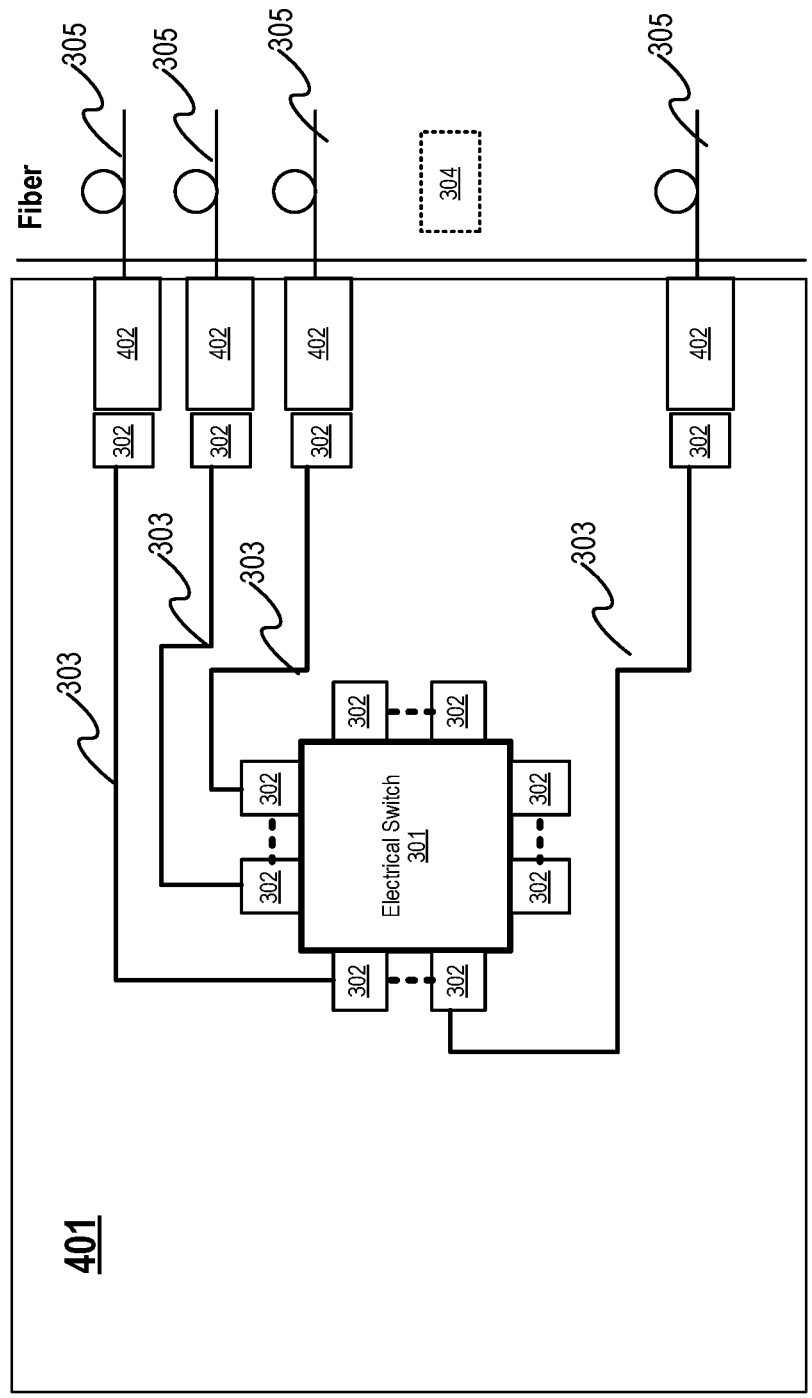
FIG. 4 illustrates the block diagram of the proposed MMWG interconnect.

FIG. 4 illustrates the block diagram of the proposed MMWG interconnect, in accordance with an example implementation. The MMWG interconnect system is defined to replace the copper trace with the MMWG 303 embedded in PCB 401 and a newly defined thin interface, the Media/MMWG adaptor (MA) 302, at both ends of the MMWG 303. The MA 302 is disposed in close proximity to the SoC 301 and to the optical module 402 configured to facilitate pluggable optics, or can also be embedded inside the cage depending on the desired implementation.

Figure 5:
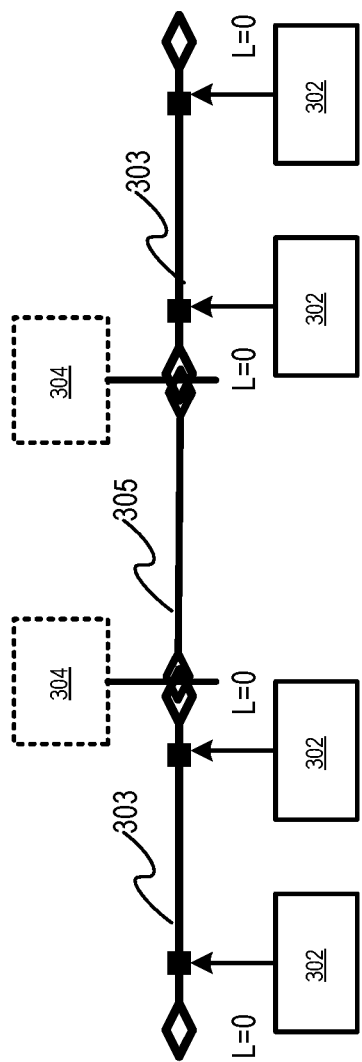
FIG. 5 illustrates an abstract link model of the proposed MMWG interconnect.

FIG. 5 illustrates an abstract link model of the proposed MMWG interconnect, in accordance with an example implementation. In order to get the power efficiency of the MMWG interconnect, the functionality of the MA is further explained in the link model shown in FIG. 5. The electrical switch output buffer drives the MA 302 at the transmitter to do electrical/optical signal conversion and send the optical signal through the MMWG 303. The optical signal is terminated with optical/electrical conversion at the input of MA 302 at receiver right before the faceplate 304. The MA 302 is made of low power consumption components as will be described herein. The remaining path from the receiver side of the fiber 305 is in the reverse order. Thus, the MMWG link removes copper traces except for the electrical interface points at MAs, which add extra power consumption along with the new integration factor. As a result, the length of the copper traces can be reduced significantly or removed altogether. Further, the optical connection can also be reduced significantly to connect to the MMWG of the PCB.

Figure 6:
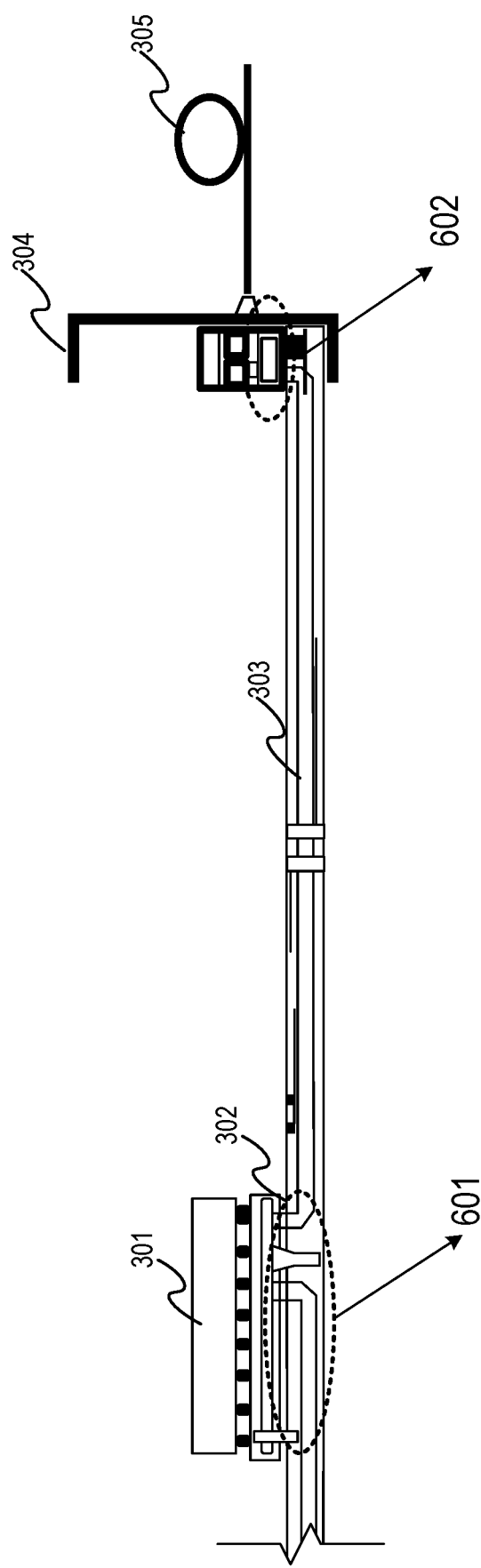
FIG. 6 illustrates a MMWG interconnect system, in accordance with an example implementation.

FIG. 6 illustrates a MMWG interconnect system, in accordance with an example implementation. In example implementations described herein, the electrical traces are minimized, while the optical traces are also shortened with the use of MMWG interconnects. The MMWG interconnects are capable of having a 2D interface with the MA 302 as shown at 601, in that the interconnects of the MMWG can be oriented at any location on the X,Y plane to interface with the MA in accordance with the desired implementation. As illustrated in FIG. 6, the MA can also be embedded inside a cage as shown by MA 602. Such a cage can also be part of the faceplate 304 depending on the desired implementation.

As will be illustrated in FIGS. 7(A) to 12, described herein is a media/MMWG adaptor configured to provide electrical/optical and optical/electrical conversion for a multi-mode waveguide (MMWG) interconnect, the media adaptor involving one or more ball grid arrays (e.g., such as a dummy ball grid array and/or a signal ball grid array) a tail-cut fiber array block (tcFAB) connected to a first array of photodiodes and a second array of laser diodes from direct optical wire (DOW) bonding.

Figure 7A:
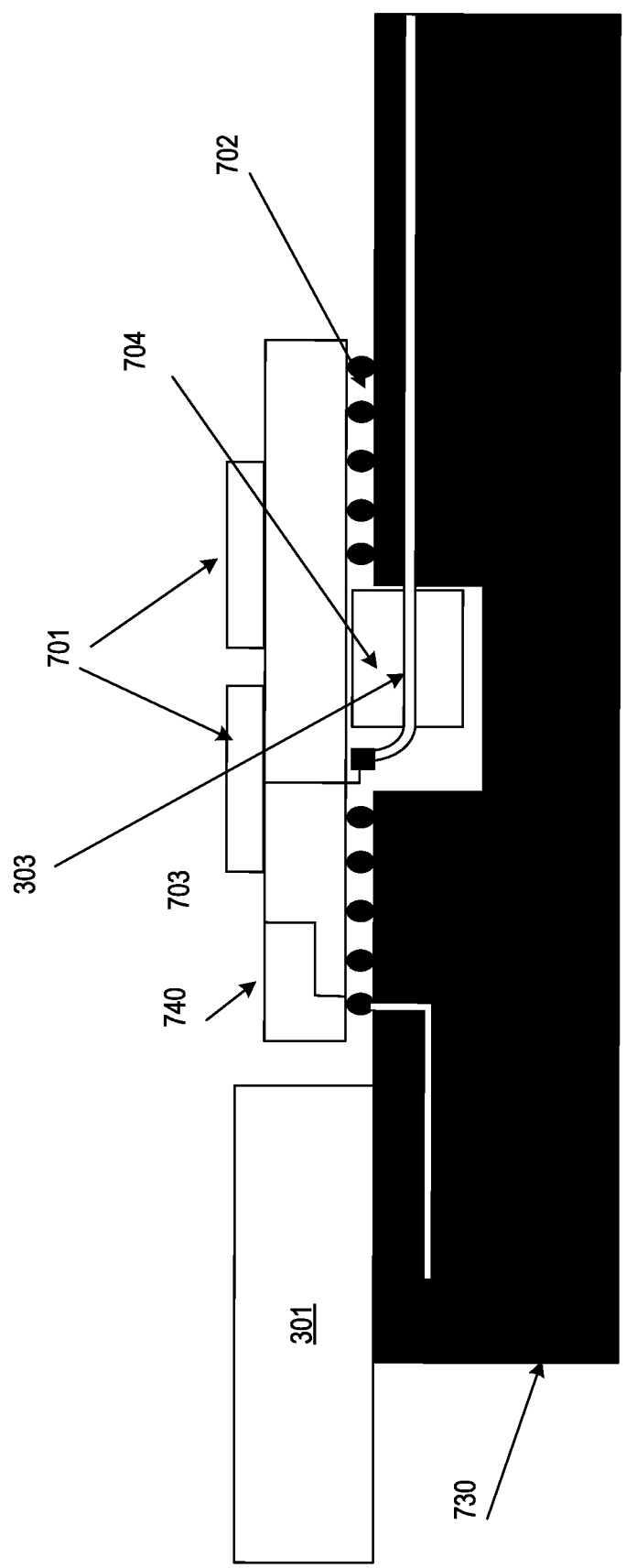
FIGS. 7(A) and 7(B) illustrate an example media adaptor, in accordance with a first embodiment.
Figure 7B:
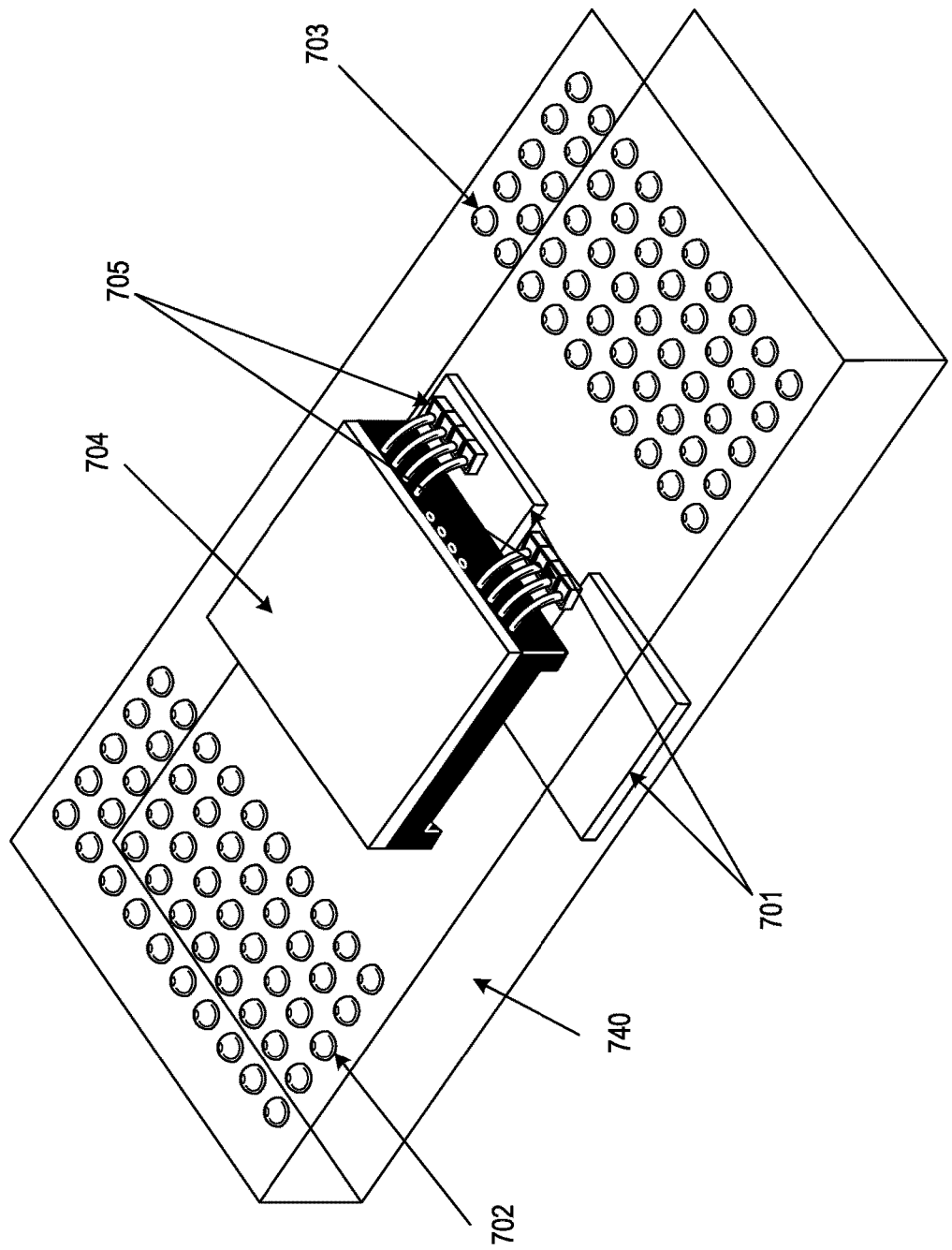

FIGS. 7(A) and 7(B) illustrate an example media adaptor, in accordance with a first embodiment. In example implementations described herein, direct optical wire (DOW) bonding is used to facilitate the media adaptor. As the media adaptor functions in the optical domain, the wires need to transmit in optical domain and are thereby bonded through the use of polymer wire bonding as opposed to electrical wire bonding. In the example of FIG. 7(B), there is one array of laser diodes (LD) for emitting light and DOW bonded to an optical transmitter chip and another array of photodiodes (PD) for receiving light that are DOW bonded to an optical receiver chip, as shown by LD/PD connected DOW 705. The disposition of the laser diodes/photo diodes and the disposition of the optical receiver chip and the transmitter chip can be swapped in accordance with the desired implementation.

The transmitter and receiver (Tx/Rx) chips 701 are coupled to a modified tail-cut fiber array block (tcFAB) 704, which is modified to cut off the fibers at the far edge of the FAB that would normally protrude out the FAB. The resulting cut portion is polished, and the tcFAB 704 is then wire bonded with DOW bonding. In essence, the modified tcFAB 704 can therefore function as a small waveguide block.

The one or more ball grid arrays are used to bond the media adaptor to the PCB via solder to align the MMWG to the optical transmitter and receiver. Further, the fibers of the FAB can be connected to the ball grid array via electrical wire bonding to facilitate electrical signal to an electrical chip so as to facilitate the electrical/optical and optical/electrical connection.

As illustrated in FIGS. 7(A) and 7(B), a signal ball grid array 703 is used to facilitate the electrical connection to the chip, whereas the dummy ball grid array 702 is used to facilitate alignment to the printed circuit board or printed optical board. The signal ball grid array 703 connects the media adaptor to a chip 301, wherein fibers of the tcFAB are connected to the signal ball grid array 703 via electrical bonding, and wherein the chip 301 is electrically connected to the signal ball grid array 703.

As illustrated in FIGS. 7(A) and 7(B), the dummy ball grid array 702 connects the media adaptor to a printed circuit board 730 via solder to align the tcFAB 704 to a MMWG 303 of the MMWG interconnect. The tcFAB 704 is connected to the MMWG 303 of the MMWG interconnect via DOW bonding. As illustrated in FIG. 7(B), a MMWG is DOW bonded to the media adaptor from the PCB to facilitate connection to the tcFAB 704, and electrical traces of the PCB are wire bonded from an electrical chip to the tcFAB 704 through the signal ball grid array 703.

Figure 7C:
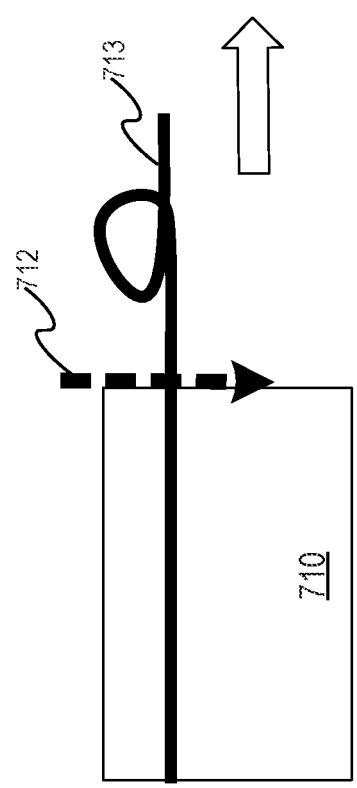
FIG. 7(C) illustrates a comparison between a standard FAB and a tcFAB.

FIG. 7(C) illustrates a comparison between a standard FAB and a tcFAB. In the embodiments herein, the standard FAB 710 is replaced by a tcFAB 704. Standard FABs 710 involve fiber pigtails 713, whereas in the embodiment, the fiber pigtails 713 of the standard FABs 710 are cut 712 with optical wire-bonding to repurpose the FAB 710 as a tcFAB 704 for the embodiments herein. In the examples of FIGS. 7(A) and 7(B), the tcFAB 704 is disposed on a substrate 740, wherein the receiver chip and the transmitter chip 701 are on an opposite side of the substrate of the tcFAB 704.

Figure 8:
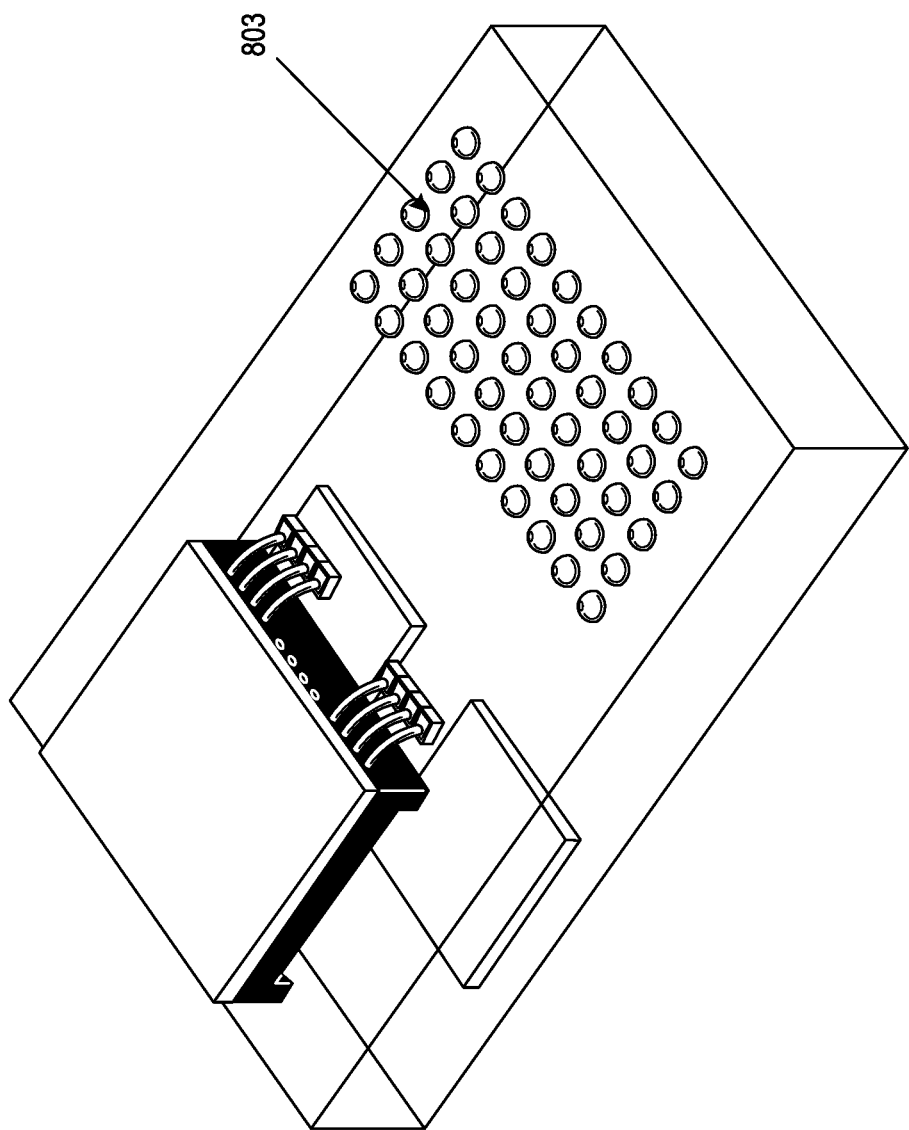
FIG. 8 illustrates an example media adaptor, in accordance with a second embodiment.

FIG. 8 illustrates an example media adaptor, in accordance with a second embodiment. In this example embodiment, if alignment is possible without the use of the dummy ball grid array, then the dummy ball grid array can be removed. Accordingly, only the signal ball grid array 803 is used so as to save space for the media adaptor as necessary.

Figure 9:
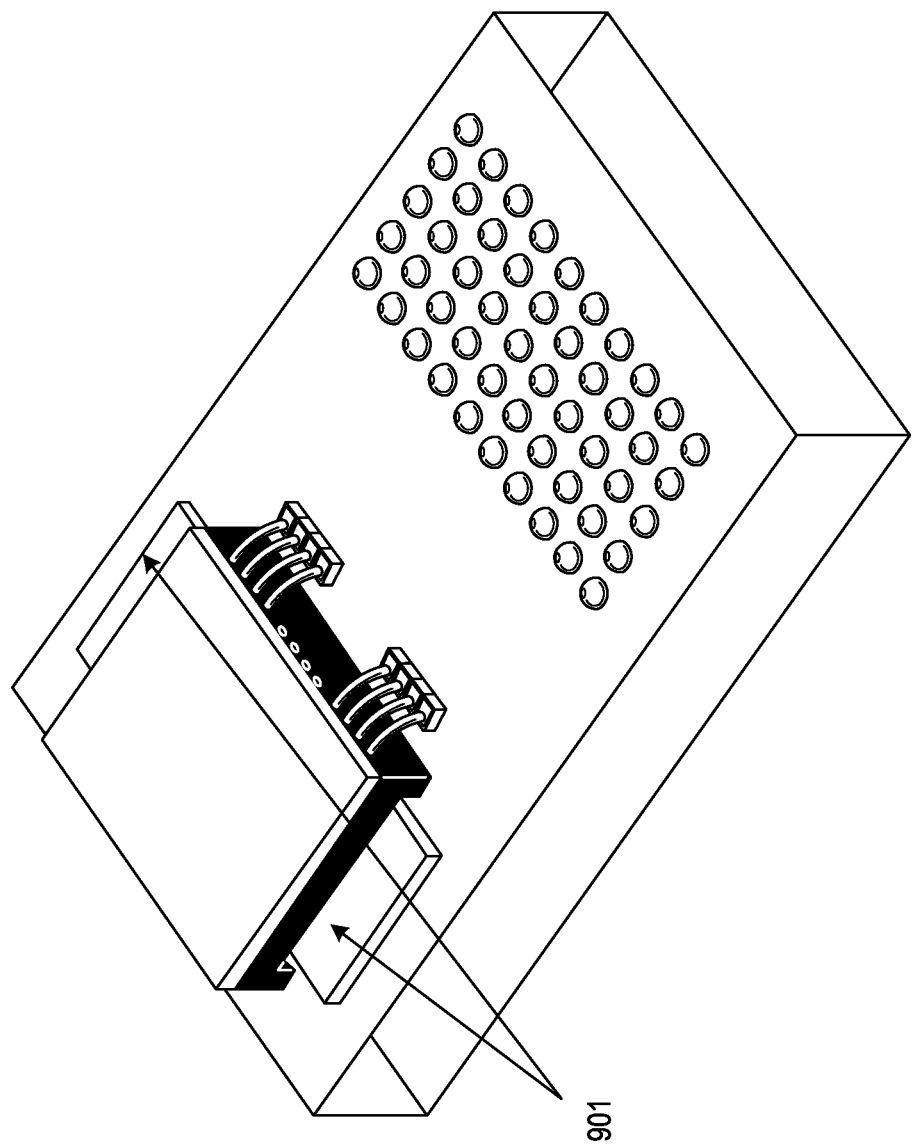
FIG. 9 illustrates an example media adaptor, in accordance with a third embodiment.

FIG. 9 illustrates an example media adaptor, in accordance with a third embodiment. In this example embodiment, the transmitter and receiver chips 901 are placed directly below the tcFAB on a same side of the substrate that the tcFAB is disposed upon. This is in contrast to disposing the transmitter and receiver chips 901 on the opposite side of the substrate so as to save space on the substrate for the MA, with the dummy ball grid array removed.

Figure 10:
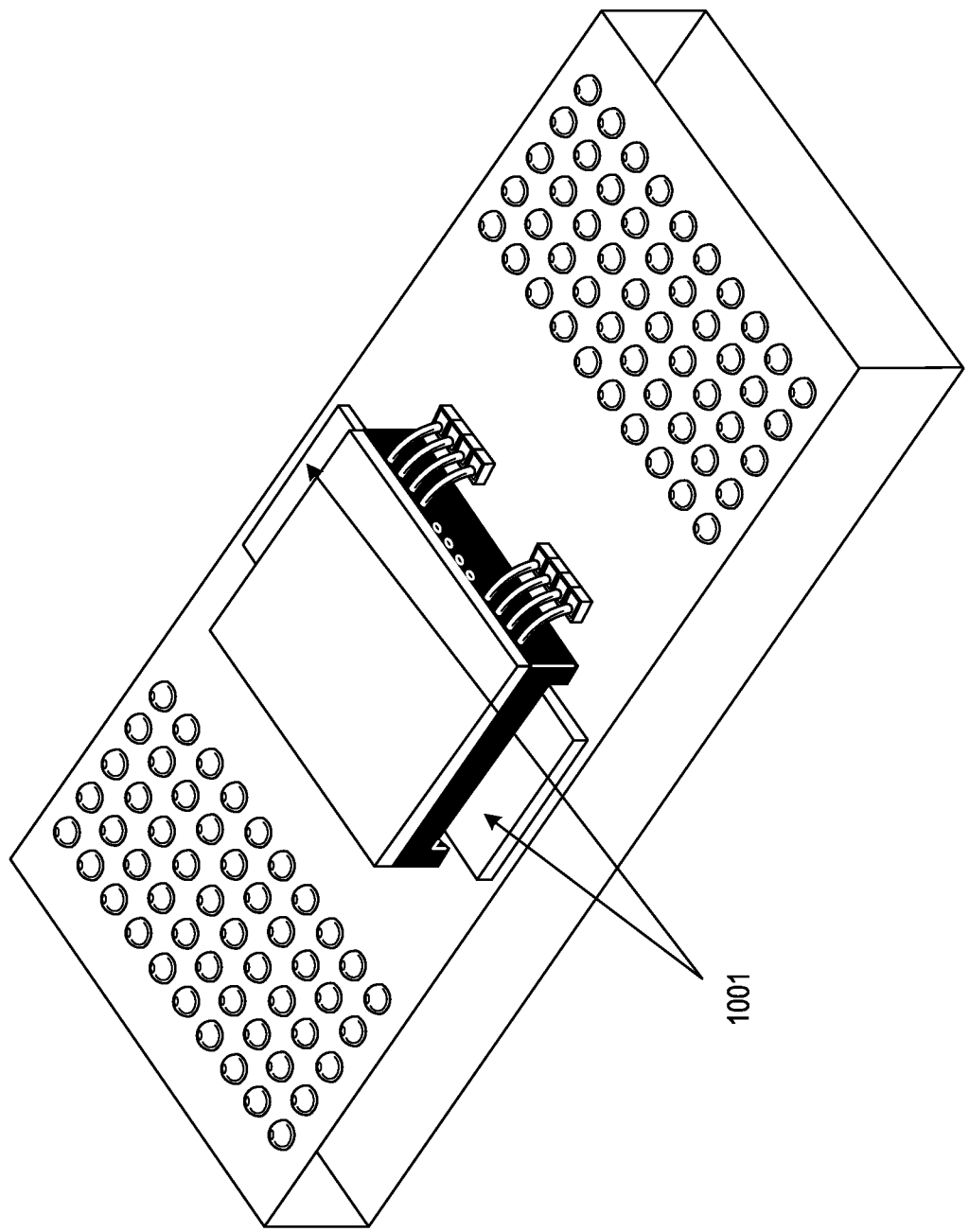
FIG. 10 illustrates an example media adaptor, in accordance with a fourth embodiment.

FIG. 10 illustrates an example media adaptor, in accordance with a fourth embodiment. In this example embodiment, the dummy ball grid array and signal ball grid array are maintained, but the transmitter and receiver chips 1001 are placed below the tcFAB.

Figure 11:
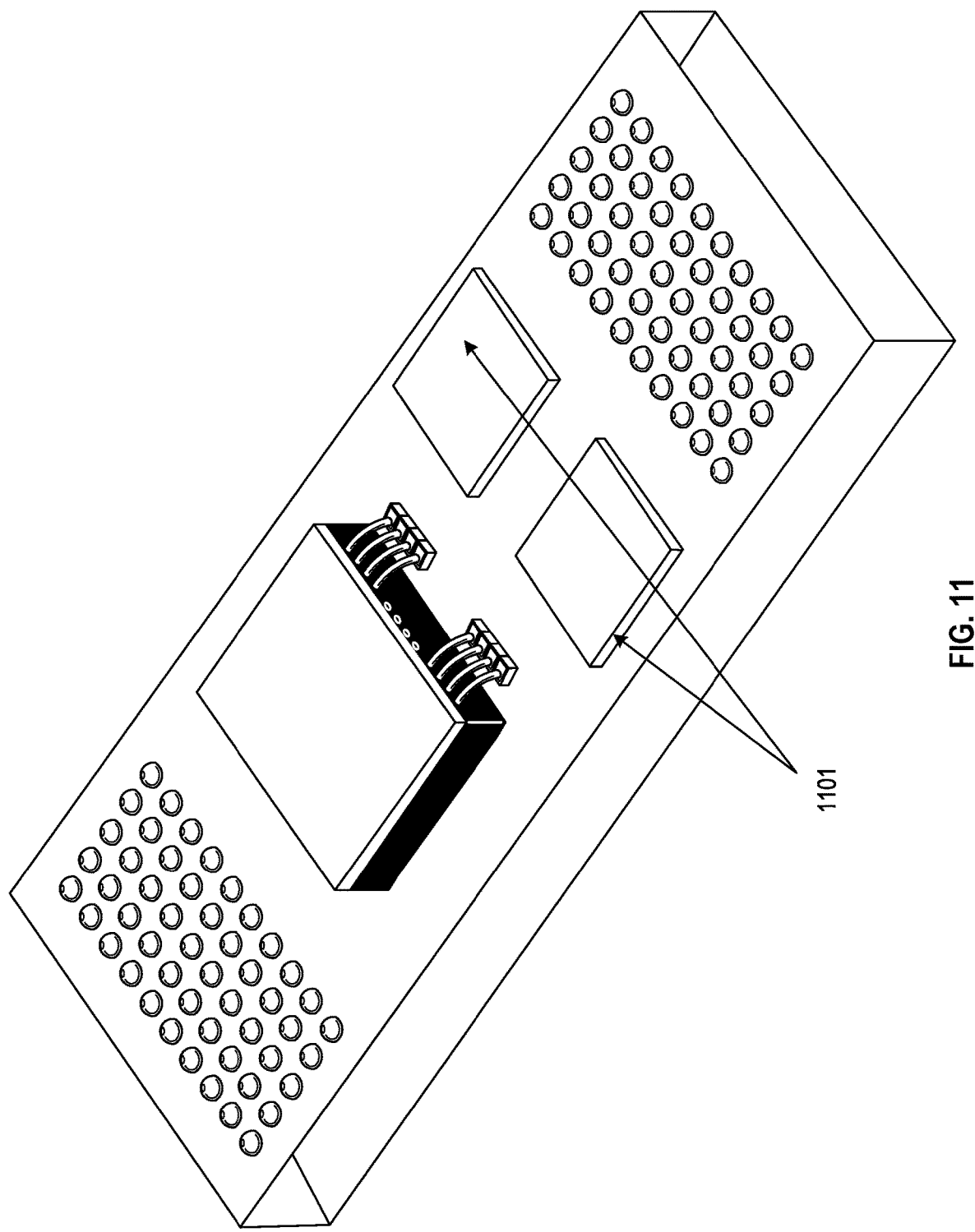
FIGS. 11 and 12 illustrate an example media adaptor, in accordance with a fifth embodiment.
Figure 12:
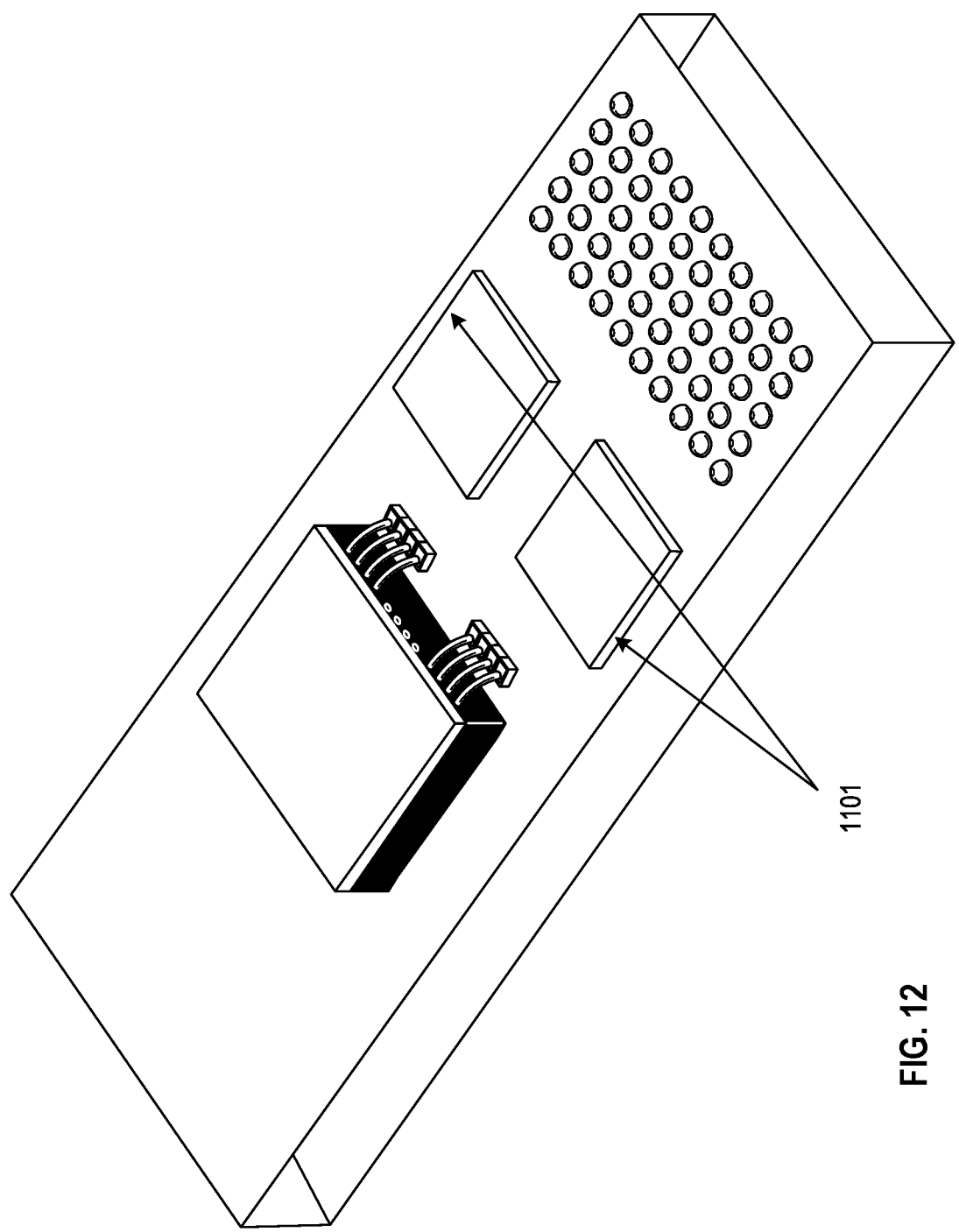

FIGS. 11 and 12 illustrate an example media adaptor, in accordance with a fifth embodiment. In this example embodiment, the transmitter and receiver chips 1101 are disposed on the substrate for the MA on the same side as the tcFAB (e.g., adjacent to the tcFAB). Such example implementations can be helpful for the implementations in which the transmitter and receiver chips 1101 can be placed on the substrate on the same side as the tcFAB as opposed to the opposite side. The example of FIG. 11 includes the dummy ball grid array, but if alignment is available, the dummy ball grid array can be omitted as illustrated in FIG. 12.

As described herein, the media adaptors described above can be involved in a system involving a multi-mode waveguide (MMWG) interconnect and a printed circuit board with MMWGs connected to the media adaptor by direct optical wire bonding.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A media adaptor configured to provide electrical/optical and optical/electrical conversion for a multi-mode waveguide (MMWG) interconnect, the media adaptor comprising:
    one or more ball grid arrays; and
    a tail-cut fiber array block (tcFAB) connected to a first array of photodiodes and a second array of laser diodes from direct optical wire (DOW) bonding,
    the one or more ball grid arrays comprising a dummy ball grid array connecting the media adaptor to a printed circuit board via solder to align the first array of photodiodes and the second array of laser diodes connected to the tcFAB from DOW bonding to at least one MMWG of the MMWG interconnect embedded in the printed circuit board.

2. The media adaptor according to claim 1, wherein the one or more ball grid arrays comprises a signal ball grid array connecting the media adaptor to a chip, wherein fibers of the tcFAB are connected to the signal ball grid array via electrical bonding, and wherein the chip is electrically connected to the signal ball grid array.

3. The media adaptor according to claim 1, further comprising a transmitter chip and a receiver chip;
    wherein the first array of photodiodes is connected to the receiver chip and the second array of laser diodes is connected to the transmitter chip.

4. The media adaptor of claim 3, wherein the tcFAB is disposed on a substrate, wherein the receiver chip and the transmitter chip are on an opposite side of the substrate of the tcFAB.

5. The media adaptor of claim 3, wherein the tcFAB is disposed on a substrate, wherein the receiver chip and the transmitter chip are disposed under the tcFAB on a same side of the substrate as the tcFAB.

6. The media adaptor of claim 3, wherein the tcFAB is disposed on a substrate, wherein the receiver chip and the transmitter chip are disposed on the same side of the substrate as the tcFAB.

* * * * *